(12) United States Patent
Min

(10) Patent No.: US 7,461,720 B2
(45) Date of Patent: Dec. 9, 2008

(54) AUTOMATIC TRANSMISSION OIL LEAK PREVENTION DEVICE

(75) Inventor: Jun Ho Min, Sungnam (KR)

(73) Assignee: Hyundai Motor Company, Seoul (KR)

( * ) Notice: Subject to any disclaimer, the term of this patent is extended or adjusted under 35 U.S.C. 154(b) by 647 days.

(21) Appl. No.: 10/891,536

(22) Filed: Jul. 15, 2004

(65) Prior Publication Data

US 2005/0107202 A1 May 19, 2005

(30) Foreign Application Priority Data

Nov. 4, 2003 (KR) ................ 10-2003-0077689

(51) Int. Cl.
*F01M 1/00* (2006.01)
(52) U.S. Cl. ............... 184/6.12; 184/6.23; 184/13.1; 74/606 A
(58) Field of Classification Search ............. 184/6.12, 184/6.23, 6.24, 6.21, 6.26, 11.1, 13.1, 106; 74/606 R, 606 A
See application file for complete search history.

(56) References Cited

U.S. PATENT DOCUMENTS

| | | | | |
|---|---|---|---|---|
| 6,065,369 A | * | 5/2000 | Kosuge et al. | 74/606 R |
| 6,450,296 B1 | * | 9/2002 | Seki et al. | 184/6.12 |
| 2003/0010151 A1 | * | 1/2003 | Johnson et al. | 74/606 R |

FOREIGN PATENT DOCUMENTS

JP 08-219259 8/1996

\* cited by examiner

*Primary Examiner*—David M Fenstermacher
(74) *Attorney, Agent, or Firm*—Morgan, Lewis & Bockius LLP

(57) ABSTRACT

An oil leak prevention device of an automatic transmission can minimize oil leaks by reducing scatter of ATF in an upward direction during revolution of a differential gear. The device includes an oil plate installed on the scattering path of automatic transmission fluid inside an automatic transmission to prevent oil from reaching and leaking from an air breather by blocking the automatic transmission fluid scattered during differential gear revolution.

10 Claims, 3 Drawing Sheets

AUTOMATIC TRANSMISSION OIL LEAK PREVENTION DEVICE

CROSS-REFERENCE TO RELATED APPLICATIONS

This application claims priority of Korean Application No. 10-2003-0077689, filed Nov. 14, 2003, the disclosure of which is incorporated herein by reference.

TECHNICAL FIELD OF THE INVENTION

The present invention generally relates to an automatic transmission of an automobile. More particularly, the automatic transmission includes an oil leak prevention device.

BACKGROUND OF THE INVENTION

Generally, during operation of an automatic transmission the automatic transmission fluid (ATF) that collects in a differential case portion within a torque converter housing becomes subject to churning by revolution of a differential gear. Typically, the AFT is dispersed to the top of the automatic transmission. A drawback of this process is that with the ATF dispersed to the upward direction within the automatic transmission from revolution of the differential gear that causes churning loss, foaming, and leaking of ATF to an air breather.

SUMMARY OF THE INVENTION

According to a preferred embodiment, the present invention provides an ATF leak prevention device that minimizes oil leaks by reducing the ATF oil scattered in the upward direction during revolution of a differential gear. The present invention also prevents the remaining churned oil from approaching an air breather within the transmission.

Preferably, the ATF leak prevention device is configured to include a means that not only reduces the quantity of oil scattered during revolution of a differential gear by being installed in the flow path of ATF that is scattered within an automatic transmission following revolution of a differential gear, but also blocks a small quantity of ATF scattered from approaching an air breather to minimize leaks into the air breather.

BRIEF DESCRIPTION OF THE DRAWINGS

For a better understanding of the present invention, the following detailed description should be read in conjunction with the figures in which.

DETAILED DESCRIPTION OF THE PREFERRED EMBODIMENTS

Figure 1:
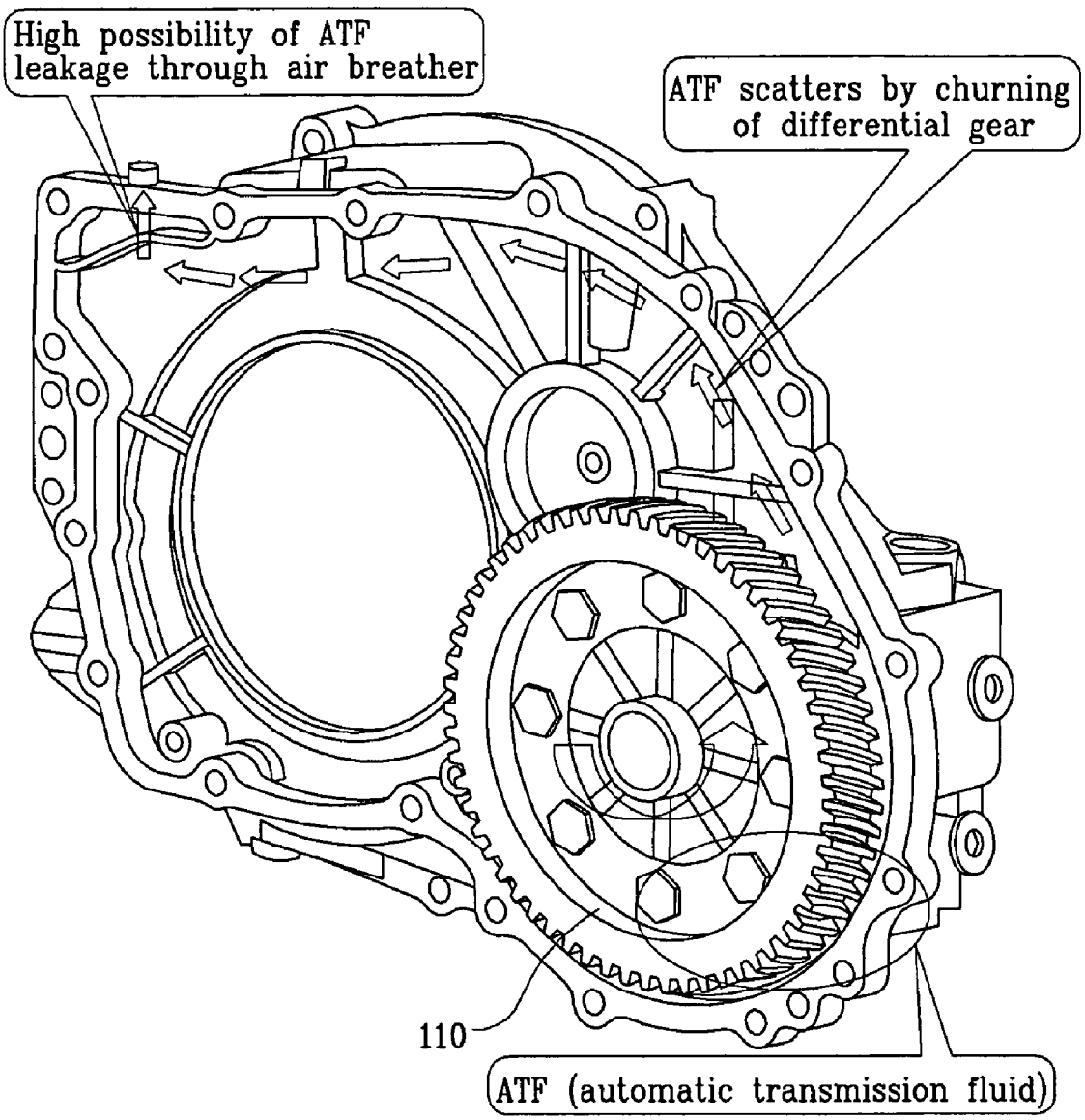
FIG. 1 shows a conventional oil scattering mechanism and pattern within an automatic transmission according to the prior art.
Figure 2:
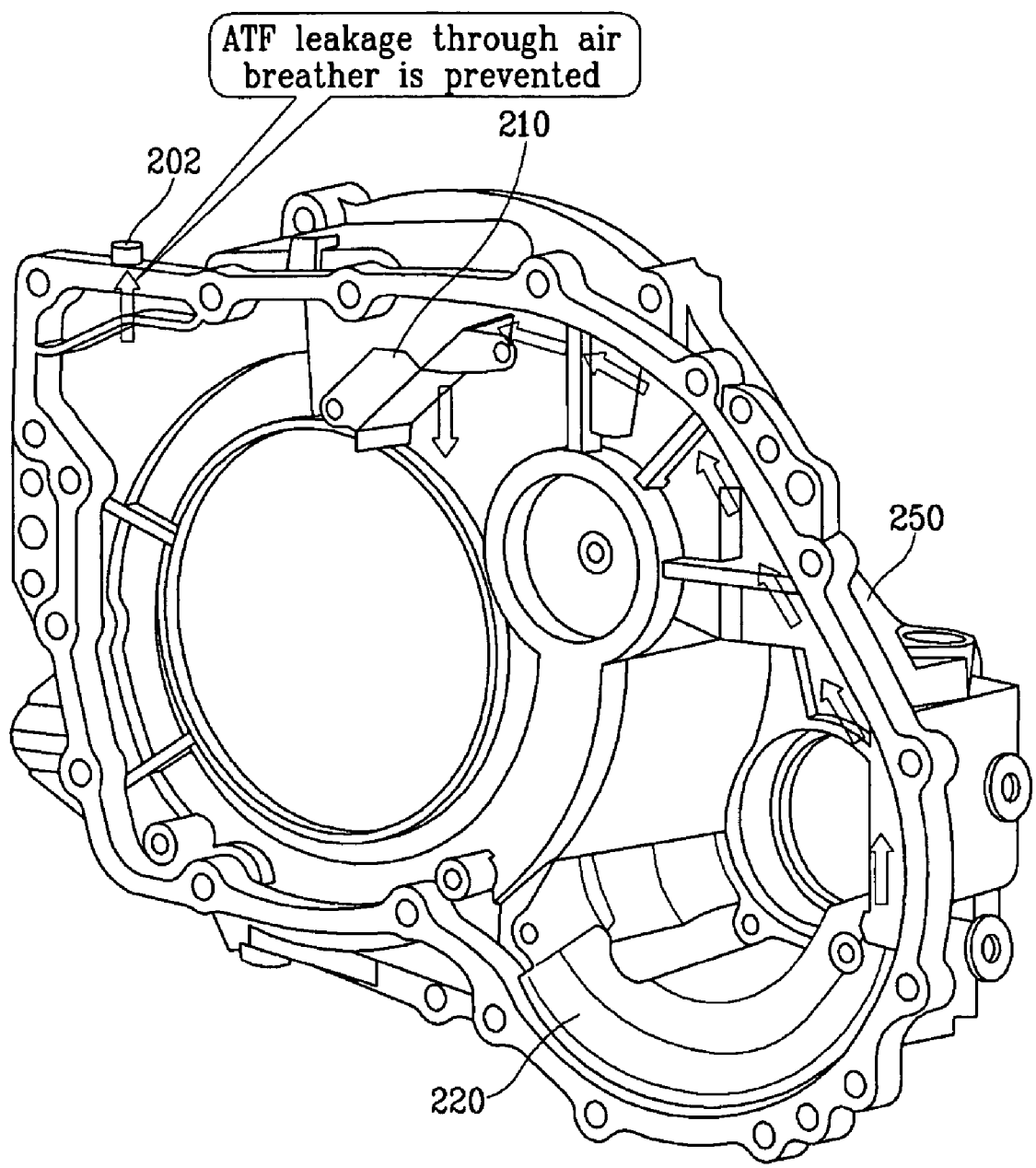
FIG. 2 illustrates a configuration of an automatic transmission in which an ATP leak prevention device is furnished according to an embodiment of the present invention.

Generally the present invention provides an oil leak prevention device for an automatic transmission. The device blocks ATF fluid that is churned by a differential gear in the torque converter from approaching an air breather of the an automatic transmission. According to FIG. 2, the oil leak prevention device is configured to include an "oil baffle plate" 210 and an oil separator 220.

Figure 3:
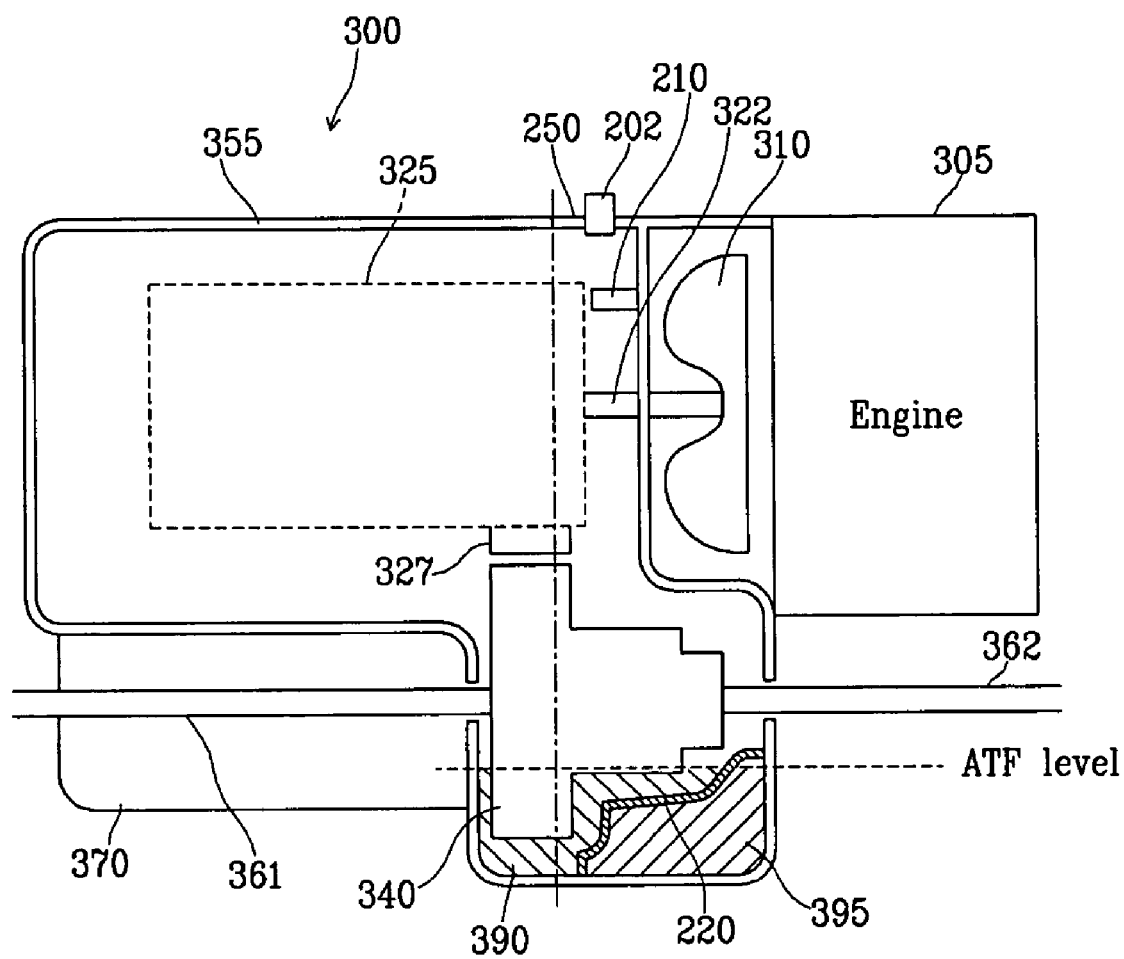
FIG. 3 illustrates an automatic transmission in which the ATP leak prevention device is furnished according to another embodiment of the prevention invention.

As illustrated in FIG. 3, the oil plate 210 prevents oil from leaking to an air breather (air vent) 202 by being installed at the top of the path in which ATF is scattered within an automatic transmission. During use of the transmission, the differential gear 340 (FIG. 3) revolves and a quantity of ATF is scattered in the upward direction in the direction of and approaching the air breather 202. With the configuration and placement of the oil plate 210, the ATF that typically leaks toward and through the air breather 202 is prevented. Furthermore, the small quantity of ATF that is scattered in the upward direction by revolution of the differential gear 340 is blocked by the oil plate 210 such that further leakage is prevented.

The shape of the oil plate 210 allows various design changes and any shape is feasible that blocks the flow of ATF from being conveyed in the direction of the air breather 202. Preferably, an oil separator 220 functions to reduce upward scattering of the ATF from ATF churning by revolution of the differential gear. As illustrated in FIG. 3, power of an engine 305 is delivered to an automatic transmission 300 after passing through a torque converter 310 and an input shaft 322. An overall case of an automatic transmission 300 includes a torque converter housing 250 mounted on the engine 305 so as to surround the torque converter 310. A transmission case 355 surrounds a power train 325 along with the torque converter housing 250, and an oil pan 370 is used to collect ATF at the bottom of the transmission case 355.

A differential gear 340 receives power from a drive gear 327 of the power train 325 is placed inside the torque converter housing 250. Therefore, to supply power from a differential gear 340 through left and right drive shafts 361, 362, the torque converter housing 250 extends downward. As a result, a portion of the ATF that has circulated within the automatic transmission 300 is drained and collects at the bottom of the torque converter housing 250. A portion of the differential gear 340 is immersed in this oil 390, 395. Thus, when the differential gear 340 rotates at a high speed some of the ATF oil is scattered in the upward direction by churning, and the oil is also caused to generate foam. Therefore, an oil separator 220 is placed close to the outer shape of the differential gear 340. The oil separator 220 is used to separate oil collected at the bottom of the torque converter housing 250. The oil collected at the bottom of the torque converter housing 250 is separated by such an oil separator 220. Therefore, since only the oil 390 collected at the left side of the oil separator 220 is scattered by churning, in FIG. 3, the quantity of oil that may be scattered is minimized.

According to an embodiment, under the condition that the quantity of oil that has been scattered is minimized by use of such an oil separator 220 at its source, the small quantity of oil scattered is blocked from approaching an air breather 202 by an oil plate 210. As a result, oil leakage through the air breather 202 is also minimized.

As described above, to prevent churning of ATF, an oil separator 220 is installed within an torque converter housing to separate ATF that may undergo churning. Also, the oil plate 210 blocks a small quantity of ATF that has been scattered during revolution of the differential gear from approaching the air breather 202 located on the top of the path of the scattered ATF. Therefore, oil leaks are prevented from occurring from the air breather 202. As described above in detail, the ATF leak prevention device according to this invention is effective to prevent oil leaks due to ATF churning during revolution of the differential gear and prevents a quantity of ATF oil scattered during revolution of the differential gear from approaching the air breather.

While the following explanation and attached drawings and other specific details are given to help with the overall understanding of the present invention, such specific details are illustrated to describe this invention, however, the present invention is not intended to be limited thereby but be defined by the appended claims and equivalents thereof.

What is claimed is:

1. An oil leak preventing device of an automatic transmission, the automatic transmission comprising a differential gear, wherein automatic transmission fluid is scattered along a scattering path defined by rotation of the differential gear, the oil leak preventing device comprising:
    an oil plate installed in the scattering path of automatic transmission fluid to prevent oil leaking through an air vent by blocking the fluid scattered during the differential gear rotation from approaching the air vent such that the scattering path ends at the oil plate.

2. The oil leak preventing device of an automatic transmission according to claim 1, further comprising an oil separator mounted so as to separate portion of oil collected at a bottom of a torque converter housing from the differential gear to reduce a quantity of oil due to the rotation of the differential gear.

3. An oil leak preventing device of an automatic transmission, the automatic transmission comprising a differential gear, wherein automatic transmission fluid is scattered along a path defined by rotation of the differential gear, the oil leak preventing device comprising:
    a means installed in the path of scattered automatic transmission fluid to prevent oil leaking through an air breather by blocking the scattered automatic transmission fluid from approaching the air breather such that the path ends at the oil plate.

4. The oil leak preventing device of an automatic transmission according to claim 3, wherein the oil leak prevention means comprises:
    an oil blocking means; and
    an oil-scattering prevention means.

5. The oil leak preventing device of an automatic transmission according to claim 4, wherein said oil blocking means is installed in a top of the path.

6. The oil leak preventing device of an automatic transmission according to claim 4, wherein said oil-scattering prevention means is configured to separate oil collected at a bottom of a torque converter housing inside the automatic transmission and installed at a bottom center of the path to reduce upward scattering of the automatic transmission fluid.

7. The oil leak preventing device of an automatic transmission according to claim 4, wherein said oil blocking means is installed adjacent to the air breather.

8. The oil leak preventing device of an automatic transmission according to claim 4, wherein said oil-scattering prevention means is formed within a differential gear adjacent to a location where churning of oil from the differential gear occurs.

9. An oil leak preventing device, comprising:
    a torque converter housing defining an air vent hole, wherein said air vent hole is positioned in an upper region of said torque converter housing;
    a revolving differential gear rotatably coupled within said torque converter housing, wherein automatic transmission fluid is scattered along a scattering path defined by rotation of the differential gear; and
    an oil deflector plate coupled with said torque converter housing at an upper portion, said oil deflector plate being configured and dimensioned to deflect oil that becomes scattered by the differential gear, such that the scattering path ends at the oil plate and the scattered oil does not come into contact with said air vent hole.

10. The device of claim 9, further comprising a wall structure mounted in a portion of the torque converter, wherein said wall structure is configured and dimensioned to separate the revolving differential gear from at least a majority of the oil collected in the bottom portion of the crankcase.

* * * * *

UNITED STATES PATENT AND TRADEMARK OFFICE
CERTIFICATE OF CORRECTION

| | | |
|---|---|---|
| PATENT NO. | : 7,461,720 B2 | Page 1 of 1 |
| APPLICATION NO. | : 10/891536 | |
| DATED | : December 9, 2008 | |
| INVENTOR(S) | : Jun Ho Min | |

It is certified that error appears in the above-identified patent and that said Letters Patent is hereby corrected as shown below:

In col. 1, line 8, change "November 14, 2003" to --November 4, 2003--.

Signed and Sealed this

Third Day of February, 2009

JOHN DOLL
*Acting Director of the United States Patent and Trademark Office*